United States Patent [19]

Hathaway et al.

[11] Patent Number: 4,916,555

[45] Date of Patent: Apr. 10, 1990

[54] METHOD AND APPARATUS FOR PRODUCING TIME BASE ALTERED EFFECTS IN DATA RECORDING AND REPRODUCING APPARATUS

[75] Inventors: Richard A. Hathaway, Saratoga; Donald B. MacLeod, Woodside; Raymond F. Ravizza, Cupertino, all of Calif.

[73] Assignee: Ampex Corporation, Redwood City, Calif.

[21] Appl. No.: 279,222

[22] Filed: Nov. 25, 1988

Related U.S. Application Data

[63] Continuation of Ser. No. 89,910, Aug. 24, 1987, abandoned, which is a continuation of Ser. No. 576,623, Feb. 3, 1984, abandoned, which is a continuation of Ser. No. 677,815, Apr. 16, 1976, abandoned, which is a continuation-in-part of Ser. No. 668,652, Mar. 19, 1976, abandoned.

[51] Int. Cl.$^4$ .............................................. H04N 5/783
[52] U.S. Cl. ................................. 360/10.3; 360/10.1; 360/70; 360/77.12; 360/77.13; 360/77.16
[58] Field of Search .............................. 360/10.1–10.3, 360/11.1, 35.1, 70, 75, 76, 77.01, 77.12, 77.13, 77.16, 78.01, 78.02, 105–109, 130.2, 130.21, 130.22, 130.23

[56] References Cited

U.S. PATENT DOCUMENTS

| | | | |
|---|---|---|---|
| 3,235,670 | 2/1966 | Kihara | 360/107 |
| 3,359,365 | 12/1967 | Kihara | 360/11.1 X |
| 3,375,331 | 3/1968 | Okazaki et al. | 360/10.2 X |
| 3,509,274 | 4/1970 | Kihara | 360/10.1 |
| 3,518,366 | 6/1970 | Phan | 360/10.1 |
| 3,526,726 | 9/1970 | Corbett et al. | 360/76 |
| 3,567,869 | 3/1971 | Hirota | 360/107 |
| 3,678,186 | 7/1972 | Narita . | |
| 3,679,838 | 7/1972 | Salcedo et al. . | |
| 3,699,247 | 10/1972 | Mashima . | |
| 3,752,918 | 8/1973 | Kurahashi et al. . | |
| 3,764,755 | 10/1973 | Yamashita et al. . | |
| 3,775,567 | 11/1973 | Bruck | 360/107 |
| 3,787,616 | 1/1974 | Falk | 360/75 |
| 3,854,015 | 12/1974 | Janssen . | |
| 3,995,317 | 11/1976 | Schmidt | 360/107 |
| 4,099,211 | 7/1978 | Hathaway | 360/107 |
| 4,203,140 | 5/1980 | Watanabe et al. | 360/70 X |

FOREIGN PATENT DOCUMENTS

| | | |
|---|---|---|
| 1039248 | 9/1958 | Fed. Rep. of Germany . |
| 1079853 | 4/1960 | Fed. Rep. of Germany . |
| 1081247 | 5/1960 | Fed. Rep. of Germany . |
| 1085688 | 7/1960 | Fed. Rep. of Germany . |
| 1130845 | 6/1962 | Fed. Rep. of Germany . |
| 1131421 | 6/1962 | Fed. Rep. of Germany . |

(List continued on next page.)

OTHER PUBLICATIONS

Price, Video Tape Recorder With Oscillating Head, IBM Tech. Disc. Bulletin, vol. 12, No. 1, 6/69, pp. 33-34.

Compaan et al, The Philips VLP System, Philips Tech. Rev. 33, pp. 178-180, No. 7.

Jannsen et al, Control Mechanisms in the Philips VLP Record Player, Philips Tech. Rev. 33, pp. 190-193, No. 7.

Primary Examiner—Alan Faber
Assistant Examiner—W. R. Young
Attorney, Agent, or Firm—Roger D. Greer; John F. Flannery; Ralph L. Mossino

[57] ABSTRACT

A method and apparatus for producing special motion effects such as slow or fast motion, still frame and other effects from video magnetic tape is disclosed which is particularly applicable to helical wrap recording and reproducing apparatus. The apparatus employs a transducing head that is mounted on a revolving scanning drum, with the head being movable in a line generally transverse to the recorded track. The present invention utilizes the transverse positioning of the head to accurately follow a track during reproducing or playback and, at the completion of the track, to properly position or set the head in position to either play the next adjacent successive track, replay the same track, or play yet another track so that special motion effects can be achieved without experiencing picture breakup or unwanted noise.

57 Claims, 4 Drawing Sheets

FOREIGN PATENT DOCUMENTS

| | | |
|---|---|---|
| 1119537 | 7/1962 | Fed. Rep. of Germany . |
| 2029897 | 1/1971 | Fed. Rep. of Germany . |
| 2426246 | 12/1975 | Fed. Rep. of Germany . |
| 2225804 | 11/1974 | France . |
| 38-17909 | 9/1963 | Japan . |
| 4838102 | 6/1973 | Japan . |
| 49-9919 | 1/1974 | Japan . |
| 4984617 | 8/1974 | Japan . |
| 51-17416 | 2/1976 | Japan . |
| 7409513 | 1/1976 | Netherlands . |
| 812468 | 4/1959 | United Kingdom . |

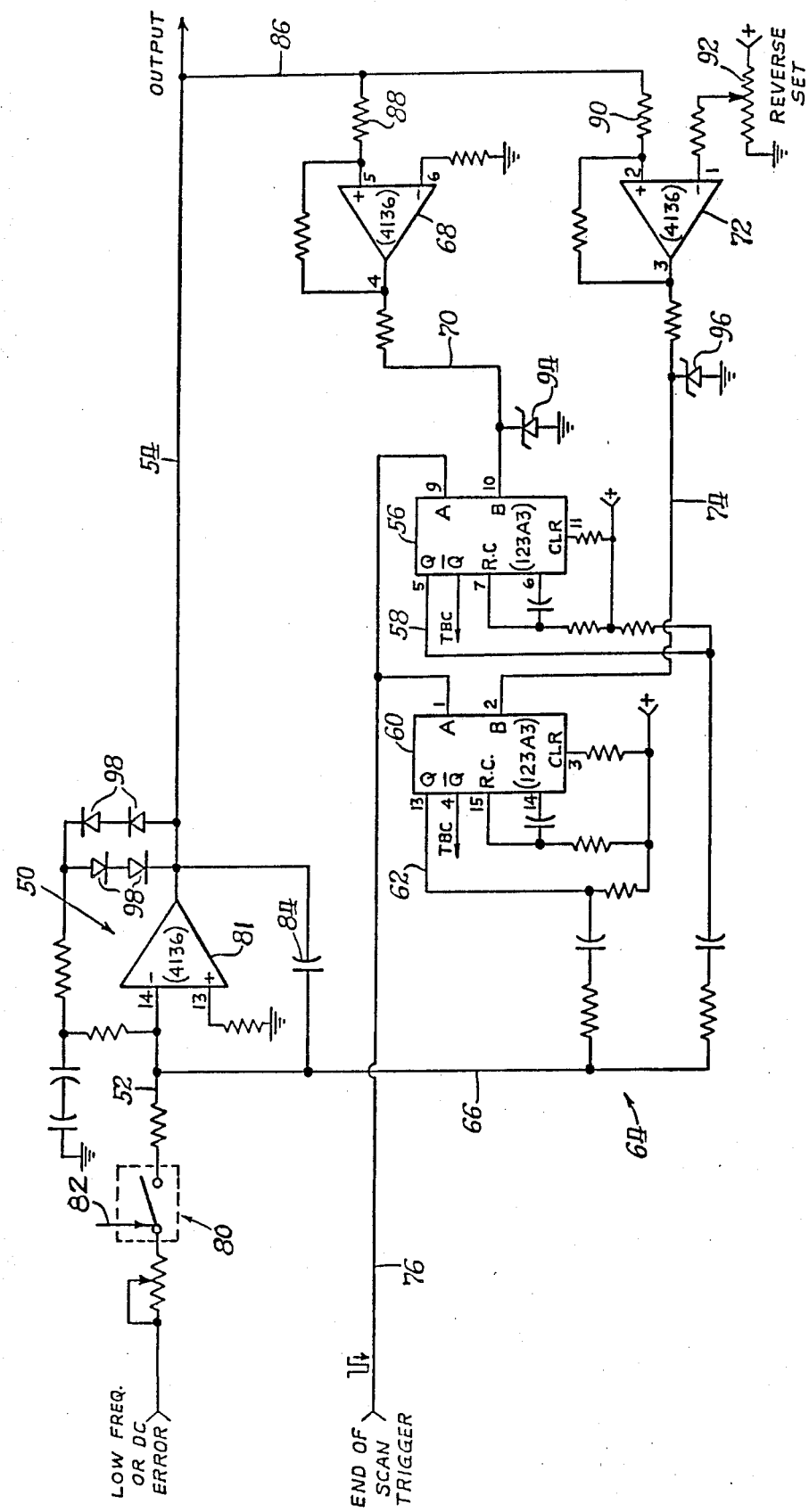

METHOD AND APPARATUS FOR PRODUCING TIME BASE ALTERED EFFECTS IN DATA RECORDING AND REPRODUCING APPARATUS

This application is a continuation of application Ser. No. 07/089,910 filed Aug. 24, 1988 and now abandoned, which in turn is a continuation of application Ser. No. 06/576,623 filed Feb. 3, 1984 and now abandoned, which in turn is a continuation of application Ser. No. 05/677,815 filed Apr. 16, 1976 and now abandoned, which in turn is a continuation-in-part of application Ser. No. 05/668,652 Mar. 19, 1976 and now abandoned.

The present invention generally relates to magnetic recording and reproducing and, more specifically, to tape recording and reproducing, apparatus and a method for achieving signal time base reference alteration effects.

The extensive research and development effort in the field of data recording and reproducing has resulted in many significant improvements in apparatus that record and reproduce data with respect to tape as well as other mediums. While there have been many different formats that have been developed, the format that records video signals on magnetic tape and transports the tape in a helix around a cylindrically shaped scanning drum has exhibited many distinct advantages in terms of relative simplicity of the tape transport drive and control mechanism, the necessary electronics involved, the number of transducing heads, and the efficient use of tape, in terms of the quantity of tape that is required for recording a given amount of material. By helically wrapping the tape around a rotating scanning head, a single transducing head for reproducing or playing the information that is recorded on the tape can be utilized. When a single head is used in a helical tape recording apparatus, two recognized alternatives are available for wrapping the scanning head, and are generally referred to as the "alpha" wrap and the "omega" wrap apparatus.

The alpha wrap has the tape introduced from one side and wrapped completely around the drum sot that it exits on the opposite side and is referred to as the alpha wrap for the reason that it generally conforms to the Greek symbol alpha (α) when one views the arrangement from above. The omega wrap introduces the tape by bringing it toward the drum in a generally radial direction and passes it around a guide to bring it in contact with the surface of the drum, helically wraps the tape around the drum, passes it around another guide so that it also exits the drum also in a generally radial direction. The tape generally conforms to the shape of the Greek symbol omega (Ω) when it is viewed from above. Both of these configurations are helical wrapped in that the tape is wrapped around the scanning drum in a helical manner with the tape exiting the drum surface at a different axially displaced position relative to the entry thereof. In other words, if the drum is vertically oriented, the tape leaves the drum surface either higher or lower than when it first contacts the surface. The video or other data information signals are recorded on discrete parallel tracks that are positioned at an angle relative to the longitudinal direction of the tape so that a track length greatly in excess of the width of the tape can be achieved. The angular orientation of the recorded tracks are a function of both the speed of the tape being transported around the scanning drum as well as the speed of rotation of the scanning drum itself. The resultant angle therefore varies depending upon the relative speeds of both the rotating scanning drum and tape being transported.

It should therefore be appreciated that if information signals are recorded on a tape at a predetermined angle which results from a precise rotational scanning drum speed and tape transport speed, the subsequent reproducing of the information signal should be performed at the same speeds or the transducing head will not follow the track with precision. If the tape speed is changed during reproduction, such as reduced or stopped, the transducing head will no longer precisely follow the recorded track and may even cross onto an adjacent track. The failure to precisely follow the track in registry during playback results in noise and other undesirable signal effects that appear in the represented information, such as a video picture. While various prior art systems have been proposed to attempt to reduce such undesirable effects due to the lack of registry, such systems have not been entirely successful even during normal tracking at speeds that are intended to be identical to those that were used during recording.

Helical tape recorders that are adapted to create special altered time base reference effects have not been particularly successful to date because of the spurious noise that is generated during playback due to the transducing head crossing from one track to another. For example, slow motion effects in video recording necessarily require that data be repeated one or more times during playback so that the visual motion is slowed down to create such effects. If data is recorded without redundancy, a track must be repeated to accomplish this and hence the tape speed changed. The resultant path that must be followed by the transducing head will be substantially different from that which was made during the recording process. Extreme difference is found in stop motion or still frame operations where the tape transport is stopped and the video head rescans a pair of adjacent tracks a number of times.

While systems have been proposed to reduce or overcome the noise band that is generated by crossing from one track to another, the systems have not been particularly successful. One prior art system for video signals employs two video transducing heads with switching means that are adapted to select the video transducing head which has the maximum output, but this approach suffers because neither head is precisely on the video track throughout its length and the signal to noise ratio suffers because of it. Other systems for video signals have attempted to minimize the effect of the crossing by using synchronization pulse lineup techniques and the like, and by modifying the helix angle by changing the tape guiding means around the scanning drum. None of these approaches have been particularly successful and slow motion, stop motion and fast motion effects have heretofore not been successfully acccomplished in helical video tape apparatus.

Accordingly, it is an object of the present invention to provide an improved method and apparatus for achieving time base reference alteration effects in tape recording and reproducing apparatus.

More particularly, it is an object of the present invention to provide a method and apparatus of the foregoing type which effects time base reference alteration by precise repositioning and control of the tracking of a transducer with respect to a track along a tape of a tape recording and reproducing apparatus.

Furthermore, it is an object of the present invention to provide an improved method and apparatus of the foregoing type which achieves slow motion, stop motion, fast motion and other altered time base reference effects in tape recording apparatus, substantially without sacrificing the quality of the reproduced signal.

Another object of the present invention is to provide an improved method and apparatus of the foregoing type which permits virtually infinitely variable slow motion speeds within predetermined limits, both in forward and reverse directins of tape transport motion.

Other objects and advantages will become apparent upon reading the following detailed description, while referring to the attached drawings, in which.

Figure 1:
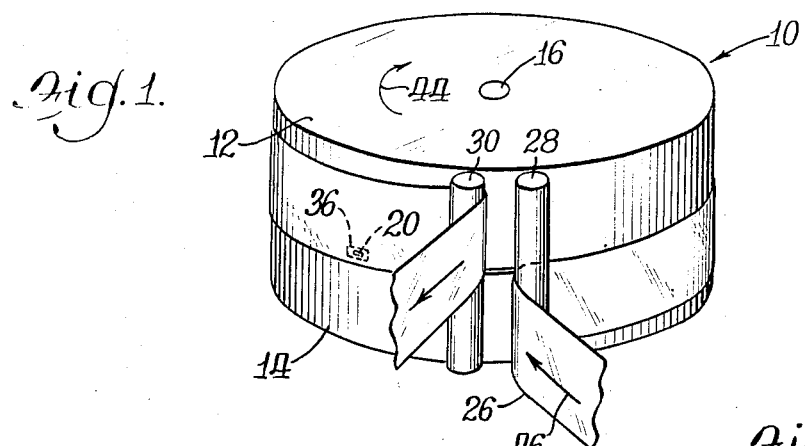
FIG. 1 is a perspective view of an omega wrap helical scanning drum simplified for the sake of clarity and embodying the present invention.

Broadly stated, the present invention is directed to a method and apparatus for successfully achieving altered time base reference effects in the art of recording and reproducing information signals on a medium. While it is suited for use in many different kinds of signal recording applications, the present invention is particularyl useful in creating altered or special motion effects from video signals. While a variety of video recording formats exist and may be adapted to the present invention, the invention is particularly attractive for use with helical tape recording apparatus to achieve special motion effects such as slow motion, fast motion and stop motion, with the slow and fast motion being carried out in both the forward and reverse directions. Thus, it is contemplated that the present invention can be used with quadrature, segmented helical and arcuate types of video tape recorders, in addition to the various helical tape recording formats.

While the present invention will be specifically described in connection with an omega wrap helical video tape recording apparatus, it is equally applicable to an alpha wrap helical tape recording apparatus. Additionally, while the present invention will be described in conjunction with a 360° omega wrap apparatus (it being understood that the tape does not contact the scanning tape guide drum a full 360° because of tape entrance and exit dimensional requirements), the present invention is also applicable to helical video tape recorders which utilize less than 360° wrap, e.g., a 180° wrap tape path apparatus having more than one head. It should also be understood that the present invention is applicable to arrangements where the scanning head can move in either rotational direction and the tape can be introduced either above or below the exit path and moved around the scanning drum in either direction. The relationships of head rotation, tape transport direction and manner of tape guiding, i.e., introducing the tape above or below the path of its exit, can represent up to eight different configurational relationships of which only one will be specifically described herein as shown by the direction of the arrows in FIG. 1 of the drawings.

Broadly stated, the present invention is directed to a method and apparatus for accurately positioning a transducing head to follow a track and to rapidly position the transducing head, if necessary, at the beginning of the track that is desired to be followed next. The next track that is to be followed is a function of the mode of operation that is selected. In the playback of video signals, the various modes may include slow motion effects, speeded up or fast motion effects, as well as stop motion or still frame effects. Moreover, other modes of operation may include skip field recording and compensating playback, as well as a surveillance mode which greatly increases the period of time that can be recorded on a given length of tape (at the expense of continuity of motion), it effectively skipping a great number of fields, such as recording one of every sixty fields, for example. The apparatus permits the tracks to be accurately followed, even though the transport speed of the tape can vary within wide limits. In the event fast motion effects are to be achieved during the playback of video signals, the transport speed of the tape must be increased and, conversely, for slow motion effects the transport speed must be slowed down. Stop motion requires that the same fields be reproduced many times and in such condition the tape is not moving at all, the relative motion between the tape and the transducing head being supplied by the rotation of the scanning drum carrying the same. Since changing the tape transport speed changes the head-to-track angle as well, it is apparent that the video transducing head that is carried by the scanning drum would not exactly follow the track when the transport speed of the tape is altered, in the event the transducing head is maintained in a fixed position.

The present invention comprises means for moving the transducing head transversely relative to the longitudinal direction of the tracks of the information and thereafter selectively alters or changes the position of the head so as to correctly position the head to commence following another track, the track being a track other than the next adjacent successive downstream track if the position of the head is in fact changed. It should be understood that during recording, one complete revolution of the scanning drum causes the transducing head to record a track at a predetermined angular orientation relative to the length of the tape and at the end of the sweep, the movement of the tape causes the recording head to be gradually displaced a predetermined distance downstream in position to begin recording the next adjacent successive track. In this manner, the tracks are recorded parallel to one another and, assuming the transport speed of the tape is maintained constant as is the speed of rotation of the scanning drum carrying the record transducing head, the tracks will have a constant spacing relative to adjacent tracks, i.e., the center to center distance between adjacent tracks will be substantially constant in the absence of geometric errors that can be introduced due to stretching, or other temperasture or humidity induced dimensional changes of the tape or by faulty tensioning mechanisms in the tape transport or the like.

Figure 2:
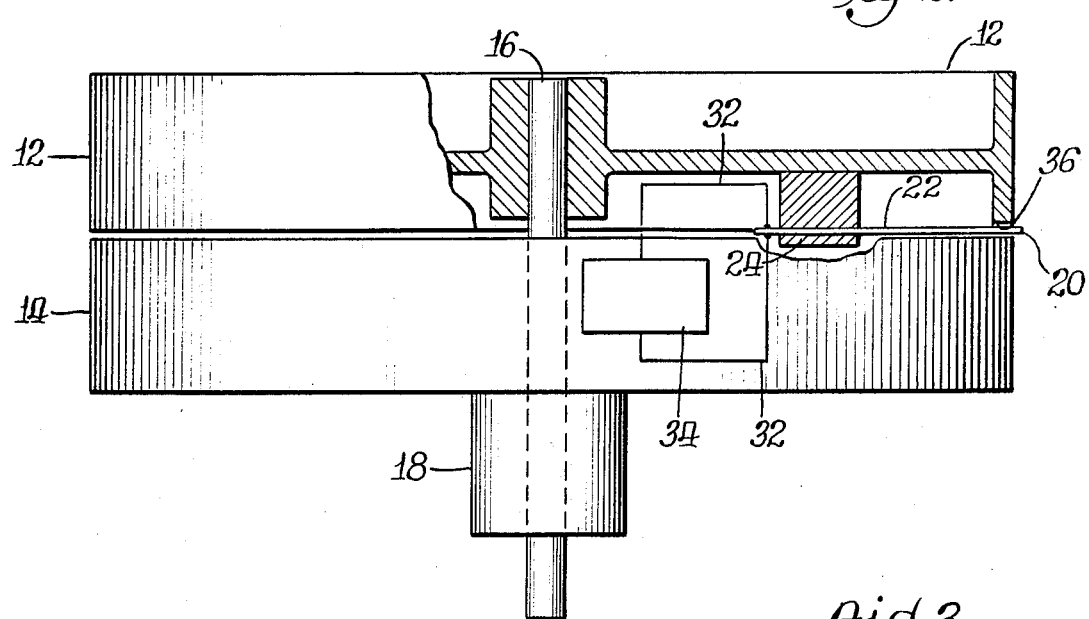
FIG. 2 is a plan view of the scanning drum shown in FIG. 1, with portions removed.

Turning now to the drawings and particularly FIGS. 1 and 2, there is shown a helical video head scanning drum, indicated generally at 10, with portions broken away in FIG. 2. The scanning drum is shown to comprise a rotatable upper drum portion 12 and a stationary lower drum portion 14, the upper drum 12 being fixed to a shaft 16 which is rotatably journaled in a bearing 18 that is mounted on the lower drum 14, the shaft being driven by a motor (not shown) operatively connected thereto in a conventional manner. The scanning drum 10 has a video transducing head 20 carried by the rotational drum portion 12 and is shown to be mounted on an elongated movable support element 22 that is in turn mounted at one end in a cantilever type support 24 that is fixed to the upper drum portion 12. The element 22 is preferably of the type that flexes or bends in a direction transversely of the recorded track during playback with the amount and direction of movement being a function of electrical signals being applied thereto, all of which will be described in detail hereinafter.

Figure 4:
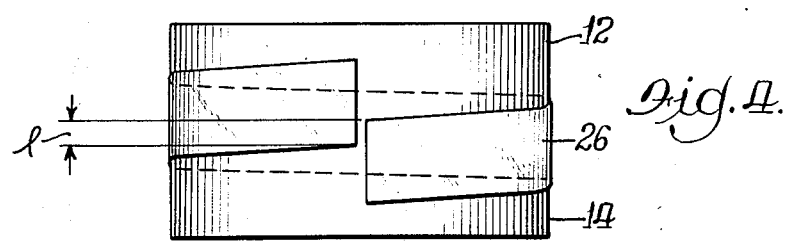
FIG. 4 is a further simplified plan view of an omega wrap helical recording apparatus.

As best shown in FIG. 1, the scanning drum 10 is part of a helical omega wrap video tape recorder which has the magnetic tape 26 advancing toward the drum in the direction of the arrow as shown. More specifically, the tape is introduced to the drum surface from the lower right as shown in the drawing and is fed around a guide 28 which brings the tape into contact with the outer surface of the stationary lower portion 14 whereupon the tape travels substantially completely around the drum until it passes around a second guide 30 which changes direction of the tape as it exits the scanning drum after it has been either recorded or played back. As is best shown in FIGS. 1 and 4, the omega wrap video tape recorder is of a configuration such that the tape being introduced is in a noninterfering relationship with the exiting tape in the sense that they do not require being crossed over one another as in the alpha wrap format and, for this reason, the lower portion of the exiting tape can overlap the upper portion of the tape being introduced so as to provide a small unrecorded band that can be used for audio and control signals and the like. The overlapping segment l is shown in the lower portion of the tape illustrated in FIG. 4.

Figure 3:
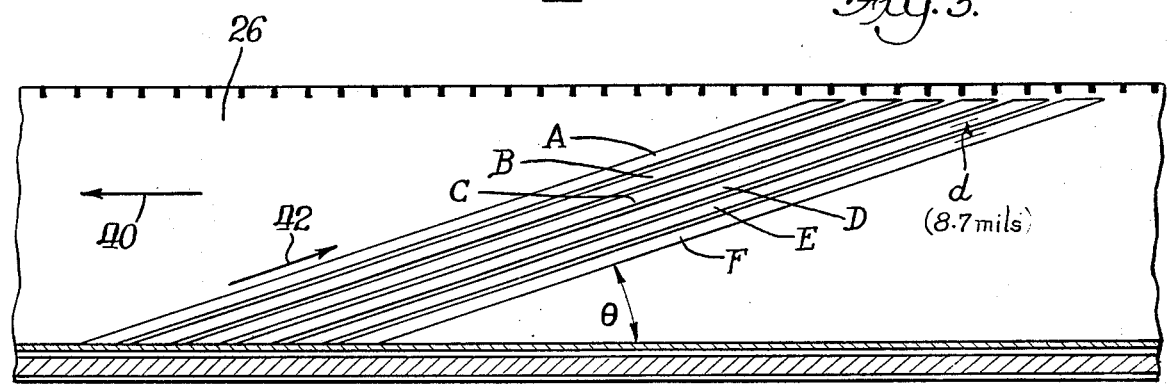
FIG. 3 is an enlarged segment of magnetic tape having tracks A-F recorded thereon.

As is best shown in FIGS. 1 and 3, the shape of the configuration is such that the tape does not contact the scan drum surface over a full 360° because of the clearance that is required for entrance and exit of the tape. However, this gap preferably does not exceed a drum angle of more than 16° which has the effect of creating a dropout of information. The dropout is preferably chosen so that the line interval that is lost does not occur during an active video line and the start of a scan of a track is field synchronized. As will be more fully explained hereafter, the dropout in the omega wrap configuration is used to advantage in the operation of the method and apparatus of the present invention.

As previously mentioned, the transducing head 20 is mounted upon the elongated movable, preferably flexible element 22 which may comprise an elongated two layer or bimorphous element which supports the transducer. It preferably comprises a thin leaf bimorphous or two layer element which exhibits dimensional changes in the presence of the electric or magnetic field and may be constructed of two layers of material suitably bonded together, at least one layer of which is piezoelectric, electrostrictive or magnetostrictive, although a bimorpher or bimorph cell comprised of two piezoelectric layers with their axis of polarity oriented in such a way that application of a field causes the deflector to flex or bend is preferred. In this regard, reference is made to copending applications of Richard Allen Hathaway, Ser. Nos. 668,571 and 668,651 filed on Mar. 19, 1976. U.S. Pat. Nos. 4,165,523 and 4,151,569 respectively, which are directed to a deflecting element and mounting structure of this type. Another configuration that is electromechanically driven for moving the head transversely of the tracks in a manner that achieves the same result as the deflectable bimorph is also disclosed in U.S. Pat. No. 4,151,569, both configurations of which are useful in practicing the present invention.

The deflectable element 22 is effective to move the transducing head 20 mounted thereto in a vertical direction as shown in FIG. 2 in accordance with the electric signals that are applied thereto through conductors 32 from circuitry schematically illustrated by block 34. The head 20 is mounted so as to extend slightly beyond the outer surface of the rotating drum portion 12, the head extending through an opening 36 in the outer surface thereof. By using the thin leaf piezoelectric bending element to suspend the transducing head for controlled positioning with respect to the magnetic tape, it is cantilevered from the support 24 that is attached to the rotating drum portion 12 for controlled positioning with respect to the magnetic tape. Thus, the deflectable element 22 is adapted to sweep or bend and displace the transducing head in response to applied electric field signals. The cantilevered deflectable element 22 is arranged with the direction of being motion of its free end carrying the transducing head along a path that is transverse to the direction of relative motion of the head with respect to the magnetic tape. Preferably, the thin leaf piezoelectric deflectable element extends from the rotating drum normal to a plane tangent to the recording surface at the point of head-to-record surface interface and substantially parallel to the direction of relative head-to-record surface motion. The transducing head 20 is mounted on the outer free end of the piezoelectric deflectable element 22 for operative engagement with the magnetic tape such that its transducing gap is oriented to have the gap length in a direction of width dimension of the deflectable element and its gap width in the direction of the thickness dimension of the deflectable element, hence in a direction transverse to the relative head to tape motion direction.

In order to respond rapidly to positioning commands and follow changes in the command signals, a low mass thin leaf piezoelectric element construction is preferred.

Moreover, the thickness of the deflectable element relative to its width should be such that virtually no deflection or movement of the transducing head can occur in a direction other than transverse relative to the track length. Thus, by applying appropriate signals to alter the position of the transducing head during operation of the apparatus, it should be understood that the head can be moved from side to side relative to the track being followed and if an appropriate error correcting signal is obtained, the head can be moved so as to accurately follow the track during playback. In this regared, the aforementioned copending applications of Richard Allen Hathaway, now U.S. Pat. Nos. 4,151,570 and 4,151,569 and an application by Raymond Francis Ravizza and James Ronald Wheeler, Ser. No. 669,047 filed on Mar. 22, 1976 now U.S. Pat. No. 4,151,570 describe apparatus for generating error correcting signals for application to the drive circuitry for the deflectable element to cause it to move the transducing head into an accurate tracking position. The apparatus provided by either of these auto tracking head applications effectively produce error correcting signals that are applied to the deflectable element 22 which moves the transducing head into coincidence with the track from the start to finsih thereof which occurs during one complete revolution of the scanning head 10.

If the transport speed of the magnetic tape is changed relative to the speed in which the information was recorded, then the effective angle of the helix is changed and error correcting signals will be produced for the purpose of having the transducing head follow the track at the different angle. Since the deflectable element is movable in either direction, the tape can be transported around the scanning head at either a faster or slower speed relative to the record speed and the element can position the head to follow the track being reproduced for either condition.

In accordance with an aspect of the present invention and referring to FIG. 3, a segment of tape 26 having a number of tracks A through F thereon is shown together with arrows 40 and 42 which illustrate the direction of tape motion around the scanning drum 10 and the direction of head scan relative to the tape itself, respectively. The orientation of the tracks and the arrows shown in FIG. 3 coincide with what is produced by the movements of the scanning drum 10 and tape 26 shown in FIG. 1 (see arrows 44 and 46). With a constant transport speed and angular velocity of the scanning drum portion 12, tracks A through F will be substantially straight and parallel to one another at angle $\theta$ (of about 3°, for example) relative to the longitudinal direction of the tape, with the rightward tracks shown in the drawing being subsequently produced during the recording operation. Since track B, for example, would be recorded immediately after track A was recorded during constant scanner rotation and tape transport speeds, it should also be appreciated that if these speeds are maintained during the reproducing or playback operation, the transducing head 20 would playback track B during a successive revolution immediately after having reproduced the information from track A.

If conditions were ideal and no distortion was introduced, then the transducing head 20 would simply follow the successive adjacent tracks without adjustment, since no error signals would be produced for transversely moving the transducing head 20 relative to the track. Stated in other words, the transducing head is automatically in position to begin reproducing the subsequent track B after completing the reproducing of the information from track A. It should also be appreciated that even if the tape transport speed is varied relative to the transport speed during record, and the angle of the track is thereby changed relative to the transducing head, if it is transversely moved to maintain accurate tracking through playback of the track, at the end of the track being played, it is nevertheless in a position to begin reproducing the next adjacent downstream track, i.e., track B in the event A was completed. This occurs even when the tape is stopped or is traveling slower or faster than the transport recording speed.

To achieve special motion and other effects during reproduction of the information signals that are recorded on a video tape or other medium, it is necessary to vary or adjust the transport speed of the tape around the scanning drum. To produce a speeded up or fast motion effect, the transport speed is increased relative to that which was used during recording. Similarly, to produce slow motion effects, it is necessary to reduce the speed of the transport tape around the scanning drum relative to that which was used during the recording process. Stop motion requires that the tape be stopped so that the transducing head on the scanning drum can repetitively reproduce the information signal from a single track.

In accordance with the present invention, the apparatus can be placed in different modes of operation wherein etiher forward or reverse motion effects are achieved and the motion can be speeded up or slowed by simply adjusting the transport speed of the tape in such forward or reverse directions to obtain the desired speed of motion during playback. Once the direction is chosen, the apparatus is effective to automatically position the transducing head to follow a track from beginning to completion and thereafter adjust the position of the transducing head (if adjustment is needed) to the beginning of the proper track.

Broadly stated, the present invention provides for resetting or transversely moving the transducing head at the end of a track to a position corresponding to the start of a track other than the next successive adjacent track under certain predetermined conditions and not resetting or adjusting the transducing head under other predetermined conditions. The decision to transversely move or adjust the transducing head depends upon the mode in which the apparatus is operating and whether the amount of transverse movement is within the predetermined limits that can be achieved. In other words, if the transducing head is deflected its maximum amount in one direction it will not be moved further in that direction. The total range of movement should be within practical limits determined by the characteristics of the element 22.

The manner in which the transducing head is controlled during the various modes of operation will now be described in connection with FIG. 5 with particular attention being initially given to FIG. 5e which is directed to the still frame or stop action mode of operation.

The stop motion or still frame mode of operation requires that the transducing head be reset at the completion of the track being reproduced and be reset to the beginning of the track so that it can be repeated as many times as is required for the duration of the stop motion. Thus, the track is effectively replayed over and over since the tape is stationary. Since the reproducing head follows the track during repeating playback, it must be reset by a distance that is equal to the track to track spacing d of the recorded tracks in order to be correctly positioned to replay the track. Since the angle of the scan of the head relative to the tape is different when the tape is stopped from the angle that was made during recording, the head is also gradually being adjusted through the course of reproducing the information signal on the track. Thus, as the scanning head moves along the track, the error correcting signals cause the transducing head to be moved transversely to follow the track and it must be reset essentially one track transverse distance d in order to be in position for beginning the replay of the same track. With the format illustrated in FIG. 1 and using the tape segment shown in FIG. 3, wherein the track width is about 5.6 mils (5.6/1000 of an inch) and the center-to-center spacing distance d between adjacent tracks is about 8.7 mils. The deflectable element 22 shown in FIG. 2, is adapted to move about 8.7 mils in either direction and these design limits are shown in the displacement pattern versus time diagrams of FIGS. 5a through 5j. Moreover, the rotating portion 12 of the scanning drum is rotated at a constant velocity of 60 revolutions per second so that the time for playing each of the tracks is relatively constant at about 16.7 milliseconds in duration. In all of the patterns shown in FIGS. 5a–5j, the 0 position on the ordinate is intended to be representative of the unbiased or home position of the transducing head which preferably occurs when no voltage is applied to the deflectable or movable element 22.

Figure 5A:
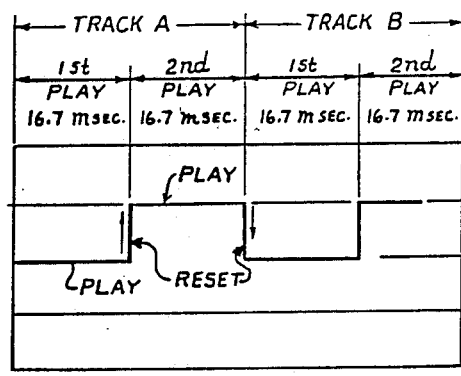
FIG. 5a is a displacement pattern for a transducing head when the apparatus is operating in a skip field mode.
Figure 5B:
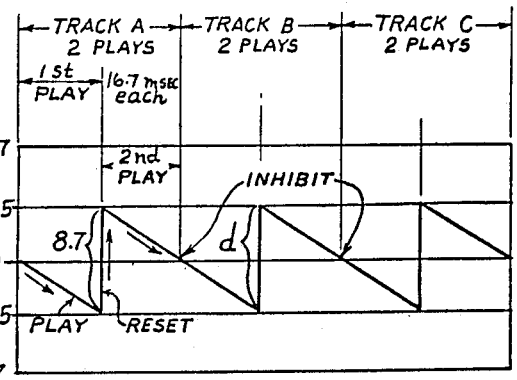
FIG. 5b-5d are displacement patterns for a transducing head when the apparatus is operating is operating in a slow motion mode.
Figure 5C:
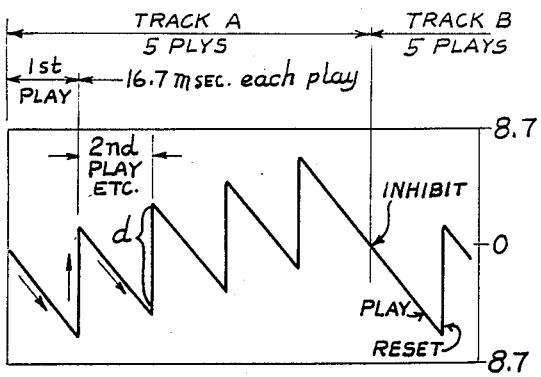
Figure 5D:
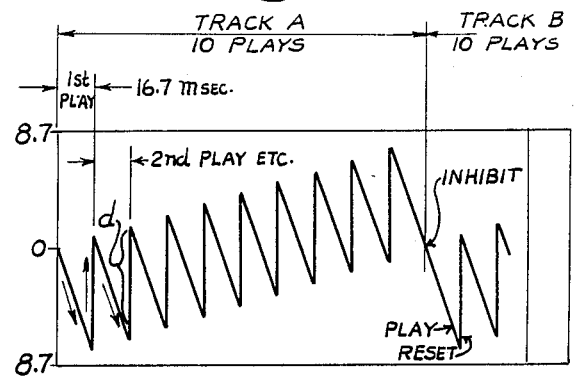
Figure 5E:
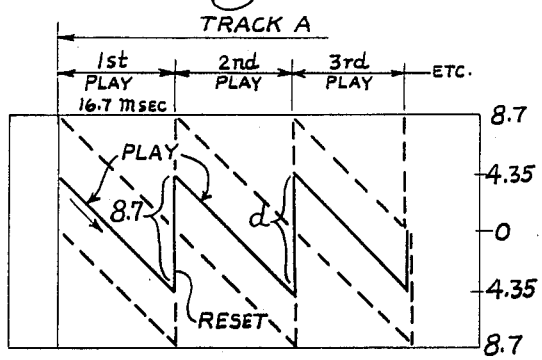
FIG. 5e is a displacement pattern of a transducing head when the apparatus is operating in a still frame or stop motion mode.

Referring specifically to the still frame or stop motion displacement pattern for positioning the transducing head shown in FIG. 5e, it is shown that each successive play of track A, for example, has an inclined portion labeled play which is followed by a reset portion that is represented by a substantially vertical line with the vertical distance of the reset approximating 8.7 mils, which is the center-to-center track spacing d between adjacent tracks. This, as the transducing head begins reproducing at the start of a track it must be positioned approximately 4.35 mils upwardly relative to the home or 0 position and through the course of the playback of the track, it gradually moves downwardly to its lowermost position indicated to be about 4.35 mils below the center line or 0 home position of the transducing head. At the end of the track, the transducing head must be reset or transversely moved to be in position to start playback of the same track again and a suitable control signal is applied to cause the deflectable element 22 to move the transducing head upwardly a total of 8.7 mils which will accurately position it to begin replaying the same track again. The repetition occurs for as long as the still frame is to be maintained.

The resetting of the transducing head is produced by a pulse being generated which has an amplitude that is proportional to and determines the 8.7 mils of deflection. The pulse will be automatically produced unless it is inhibited with the ingibiting being a function of the position of the transducing head near the end of a playback i.e. at or near the lower point of the play portion of the pattern shown in FIG. 5e. If the position of the transducing head is detected to be below the home or 0 position at the end of the scan of a track, then a reset pulse will be produced and the head will be reset in the illustrated manner. However, if the position of the transducing head is above the home or 0 position at the completion of scanning a track, then the reset pulse will be inhibited and the next track will be begun. In the absence of the application of any control signals that would reposition the transducing head, it would be in position to begin tracking the next adjacent track at the completion of the foregoing track as has been previously described. Thus, the absence of a reset pulse causes the transducing head to advance from track A to track B, for example, the condition arising due to producing an inhibiting signal that inhibits the reset pulse. The manner in which the signals are produced and inhibited will be more fully described with respect to the description of the operation of the circuitry shown in the block diagram of FIG. 6.

Turning now to a general description of the displacement patterns that are followed during slow motion effects reference is made to FIGS. 5b, 5c, and 5d which respectively illustrate the displacement patterns for slow motion effects where the tape is transported at ½ (FIG. 5b), 1/5 (FIG. 5c) and 1/10 (FIG. 5d) of the speed during recording. It should be understood that the patterns are intended to illustrate the number of repetitions or replays that occur for each track and this number is a function of the transport speed relative to the speed during the recording process. Thus, if the transport speed of the tape around the drum is reduced to ½ of the speed during recording, it is then necessary that each track be played twice since the scanning drum continues to operate at the same rotational speed of 60 revolutions per second. Similarly, if the transport speed is 1/10 that of record speed, then each track will be reproduced ten times before the next track is reproduced.

The present invention is adapted to adjust the number of replays to the transport speed of the tape as will be described hereinafter. Returning to the slow motion displacement patterns shown in FIG. 5, and particularly FIG. 5b which illustrates the pattern of movement for the transducing head when the transport speed of the tape is ½ the speed that is used during recording, it is necessary for each of the tracks to be played two times, i.e. each track repeated once, before the next track is played. Thus, the first play of track A has the transducing head deflected downwardly about 4.35 mils until it reaches the completion of the track whereupon it is reset a total of about 8.7 mils upwardly in position to replay track A a second time. Near the completion of the second playback of track A, the transducing head approaches the home or 0 deflection position which is detected and the reset is inhibited so that the track B can be scanned. Similarly, the transducing head is deflected downwardly about 4.35 mils as was the case with respect to track A and the pattern is repeated from track to track as is shown.

In the event the transport speed is slowed further, such as 1/5 the record speed shown in FIG. 5c or 1/10 the record speed as is illustrated in FIG. 5d, the tracks will be replayed 5 or 10 times, respectively, as shown in the drawings. With respect to the displacement pattern in FIG. 5c, the head begins in its home position on the first play of track A and is deflected downwardly until it reaches the end of the track whereupon it is reset to play at the track again, requiring about 8.7 mils displacement. It follows the track a successive number of times, the lower displacement of each successive play gradually approaching the home position since the track is physically moving around the scanning drum during the successive plays and therefore moves gradually upwardly along the helical path of the tape. During the last play of track A, the position of the transducing head near the end of the play is above the 0 or home position which is detected and results in beginning the first play of the next track B. In a similar manner, the slower movement of the tape around the scanning drum shown in FIG. 5d results in track A being replayed a total of ten times before the transducing head is at or above its home position near the completion of the final play which is detected and permits the head to begin playing track B.

From the three foregoing described speeds of tape transport that results in the slow motion play, it should be understood that a track will be replayed as many times as is required to result in the transducing head being at or above the home or 0 position at the completion of the playback of the track being repeated, no matter how many times this occurs. When this condition is detected, the reset is inhibited and the transducing head starts the playback of the next adjacent successive track. The amount of movement during each reset is constant at the approximately 8.7 mils for the apparatus described herein, the distance being equal to the track to track spacing d.

Figure 5F:
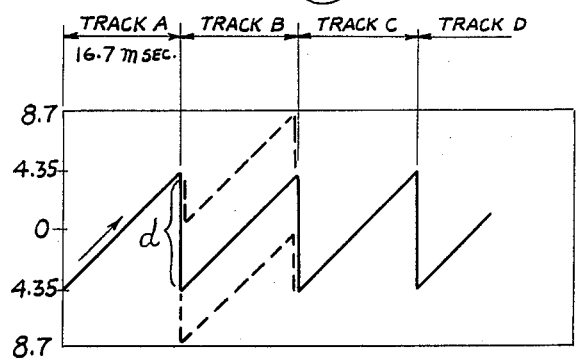
FIG. 5f is a displacement pattern for a transducing head when the apparatus is operating in a surveillance mode.
Figure 5G:
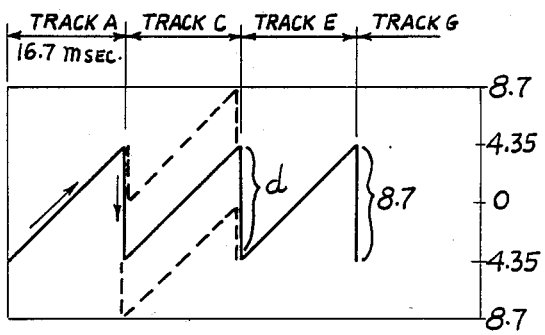
FIGS. 5g and 5h are displacement patterns for a transducing head when the apparatus in operating in fast motion modes.
Figure 5H:
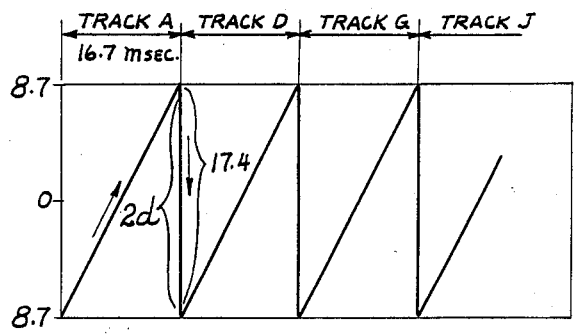
Figure 5I:
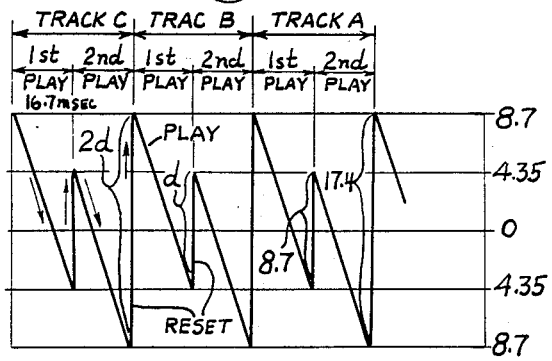
FIGS. 5i and 5j are displacement patterns for transducing heads when the apparatus is operating in slow motion and normal speed, respectively, with the tape being transported in the reverse direction.
Figure 5J:
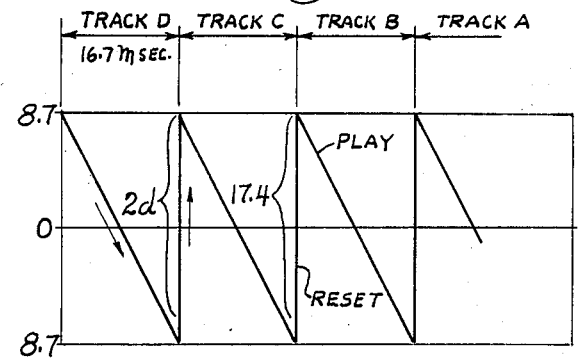

In accordance with another aspect of the present invention, other special motion effects in addition to the slow and stop motion that has been described are capable of being achieved, particularly reverse motion at normal and slower speeds. Referring to FIG. 5j, a displacement pattern is shown for the transducing head and illustrates the movement of the head during reverse direction tape transport at normal playback speed. Unlike the other pattern shown in FIG. 5, track A is shown to the right with the tracks B, C and D being successively leftward which is opposite the direction of the other figures. This denotes the reverse direction as is desired, it being understood that the scanning head follows each track in the same direction as was followed with respect to slow motion and stop motion, i.e., the direction of scan is from the top to the bottom of the angled portion of the pattern of FIG. 5j, followed by a reset movement to position the transducing head for playback of the next desired track. While the scanning head moves in the same direction relative to the tracks during playback of the tracks, the tracks must be played in reverse sequential order relative to the order during forward direction playing. The displacement pattern shown in FIG. 5j is for regular speed in the sense that the tape is transported around the scanning drum at the same velocity as was used during recording, but in the opposite direction. As is shown by the displacement pattern in FIG. 5j, the resetting of the transducing head is greater than has been heretofore described, in effect moving two 8.7 mil distances for a total of 17.4 mils, with the greater movement being necessary to transverse a total of two center-to-center spacings d to dorrectly position the tape on the upstream or prior track. This can be readily visualized if it is recalled that to replay a track during slow motion or stop motion effects, it was necessary to displace the transducing head a single center-to-center distance of about 8.7 mils in order to reposition it for repeating playback of the same track. In the event a track prior to the track being played is to be played, still another track to track distance would be required to position it at the beginning of the prior track. Thus, a total of two multiples of center-to-center spacing d are required to reproduce the information signal in a reverse direction at normal speed.

To achieve slow motion in the reverse direction, it is necessary to reduce the tape transport speed in the reverse direction and repeat the playback of the tracks one or more times, depending upon the reverse transport tape speed. Thus, referring to FIG. 5i, a reverse direction half speed displacement pattern is illustrated wherein each of the tracks is repeated once before the next preceding track is played. Thus, after track C, for example, is played the first time, the transducing head is reset a distance of one center-to-center spacing d, i.e. 8.7 mils, and track C is played a second time until the downward deflection of the transducing head is detected at the lower extreme of the second play which causes a "double" magnitude reset signal to be produced and the transducing head is deflected about 17.4 mils upwardly which positions it at the start of track B. The lower extent of the first play of track B is at a downward deflection of about 4.35 mils which is not a sufficient deflection to cause generation of a double magnitude reset pulse so that only an 8.7 mil deflection is produced which causes the track B to be played a second time. In this manner, the slow motion effect in the reverse direction is achieved. When the position of the transducing head at the end of a track is sufficiently displaced relative to the home position, then a signal that deflects two center-to-center track spacings or about 17.4 mils is produced.

The manner in which the circuitry associated with the present invention operates to produce the displacement patterns that have been discussed above will be described in connection with the schematic block diagram of FIG. 6. As previously alluded to, an error correcting signal that is preferably a low frequency or changing D.C. level is produced by apparatus such as the sensing heads disclosed in the Hathway U.S. Pat. No. 4,165,523 or the dither apparatus disclosed in the Ravizza et. al. and Hathaway U.S. Pat. Nos. 4,151,570 and 4,151,569,respectively, both of which are assigned to the same assignee as the present invention, with the error signal being applied to an integrator 50 through input line 52. During the scanning of a track, the error signal caused the transducing head to be adjusted so as to follow the track regardless of the speed of tape transport, provided that it is within the limits of deflection of the element 22. The integrator provides a ramp signal, the slope of which is determined by the D.C. or low frequency error signal that is derived from the head positioner servo circuitry. This, the servo error modulates the slope of the ramp as the transducing head position error changes, and the output of the integrator appears on line 54 which extends to summation circuits that drive the transducing head movable element 22. In addition to the low frequency or changing D.C. level error signals, a dither signal and high frequency error signals may be added to the composite control signal that is used to drive the positioner in addition to the reset pulse which effectively produces the reset portion in the displacement patterns of FIG. 5 as previously discussed. A pulse generator 56 produces the reset pulse which has a magnitude that is proportional to a desired one track deflection that is to be achieved by the element 22. In other words, the size of the reset pulse determines the amount of deflection needed to reset the transducing head a distance equal to the center-to-center distance d, i.e., the 8.7 mils in the illustrated embodiment, or a reset pulse that will produce 17.4 mils of displacement which represents two multiples of the center-to-center spacing d. The pulse generator 56 is adapted to produce the pusles on output line 58 when the tape is transported in both the reverse and forward directions and pulse generator 60 provides an output pulse on line 62 of the same magnitude as that produced by generator 56 under certain conditions which only occur when the tape is transported in the reverse direction. If pulses appear on both outputs, an adder 64 will provide an output pulse that is the sum of the two pulses and thus provide a pulse that will produce a reset of two center-to-center spacings. The reset pulses appear on line 66 which extends to the input of intergrator 50.

A forward mode tape level detector 68 monitors the integrator output and is adapted to provide an inhibit output signal on line 70 for inhibiting the pulse generator from producing a pulse on output 58 when the ramp signal is below a set level at the end of a scan. Similarly, the reverse mode level detector 72 monitors the ramp voltage from the integrator 50 and produces an inhibit signal on line 74 until the ramp signal reaches a predetermined level that corresponds to slightly more than one track higher than the level of detector 68. In the reverse mode, the inhibit signal inhibits an output on line 62 so that only a single track spacing reset magnitude pulse will be produced by the pulse generator 56 which is triggered in response to receiving an advanced end of scan command on line 76 derived from a tachometer generator mounted for rotation with the rotatable drum 12 of the scanning drum. The tachometer may be of conventional design for providing a tachometer pulse once for each revolution of the rotatable drum 12. For convenience, the tachometer is mounted to the rotatable drum 12 so that it occurs just before the dropout. Tachometer processing circuits conventional to helical recording devices are employed to provide from the scanner tach pulse circuit timing pulses to the helical recording device used to control operative functions. For the purpose of triggering pulse generator 56 to provide the reset pulse to integrator 50, the advanced end of scan command is generated from the scanner tach pulse provided just prior to the end of the scan of a previous track. The previous track related tach pulse is processed by a conventional counter included in the tachometer processing circuits to be present on line 76 just prior to the end of the scan of the current track.

Figure 7A:
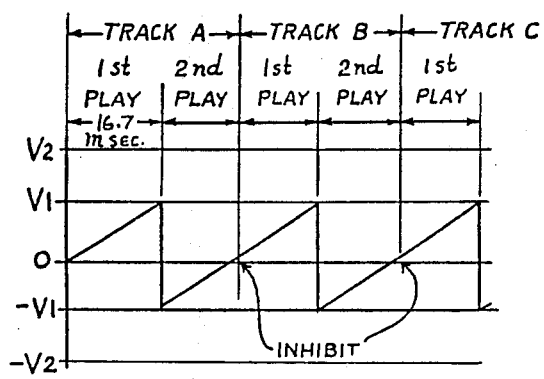
FIG. 7a is a voltage output wave form produced by the circuitry shown in FIG. 6 for producing the displacement pattern for the half speed slow motion operation shown in FIG. 5b.

The circuit is operable to provide a wave form at the output of the integrator for the various modes of operation which is generally the reciprocal or mirror image of the displacement patterns of FIG. 5 for the various modes. As an example, the half speed slow motion in the forward direction having the displacement pattern shown in FIG. 5b results from the integrator output wave form shown in FIG. 7a. By comparing the wave forms of FIGS. 5b and 7a, it is apparent that the shape is merely inverted. Thus, in FIG. 7s, the integrator 50 provides an output wave form that rises during the playback of a track, with the slope of the ramp portion of the wave form being a function of the D.C. error input applied on line 52 that is derived from error detecting circuitry. With the voltage ramp rising during the playing of a track, the end of scan trigger pulse from the conventional trigger pulse generating circuitry (not shown but previously described) triggers the pulse generator 56 and it will provide an output pulse at the end of playing a track which will be applied through the adder 64 and line 66 to the input of the integrator 50. Since the output pulse from the pulse generator 56 is a very short duration positive pulse, it has the effect of resetting the output voltage to a level which produces the desired displacement of the transducing head in position to play the track a second time. As the integrator output increases during the second playback of track A, the end of scan trigger circuitry will provide the trigger pulse to the pulse generator 56 at the appropriate time near the completion of the second play. However, for froward level detector 68 continually monitors the instantaneous voltage at the output of the integrator 50 and provides an inhibiting signal on line 70 which inhibits the pulse generator 56 whenever the instantaneous voltage is less than about zero. Thus, as the second playback of track a is approaching completion and the end of scan trigger pulse is applied to trigger the generator, the detector will detect that the output voltage is less than 0 as shown in FIG. 7a and the detector will generate an inhibit signal on line 70. The pulse generator will thereby be inhibited which results in the integrator 50 not being reset and continues onward in effect following track B through the first playback. Since the voltage of the integrator output near the end of the first play is positive, the forward level detector 68 does not inhibit the generator and a reset pulse in produced.

When the tape is transported in the reverse direction for the purpose of providing backward or reverse motion effects during playback, it is necessary for the transducing head to be reset to play a preceding in time track as previously mentioned. In the event that slow motion reverse direction playback is to be performed, at half speed, for example, the circuit of FIG. 6 will produce a voltage output wave form shown in FIG. 7b. A comparison of the wave form of FIG. 7b with the displacement pattern of FIG. 5i shows a mirror image or inverted pattern as was the case with respect to those shown in FIGS. 5b and 7a. As the tape is following track A through the first play, the instantaneous voltage near the end of the scan is above 0 as shown in FIG. 7b and pulse generator 56 will therefore produce a reset pulse which will have the effect of resetting the transducing head one center-to-center spacing spacing distance of 8.7 mils. The transducing head will then follow track A through a second scan or playback and the voltage of the ramp will approach the higher level V2, which higher voltage is detected by the reverse level detector 72. When the end of scan trigger pulse is produced, the pulse generators 56 and 60 will both be operable, because level detector 72 will not provide an inhibit on line 74. The output pulses of the pulse generators 56 and 60 are added together by the adder circuit 64 and a pulse having a double magnitude appears on line 66 which is applied to the input of integrator 50, resetting the same so that the transducing head is moved a distance equal to two center-to-center track spacings or about 17.4 mils in the illustrated embodiment. In this manner the tracks are played back in reverse time or sequence order, but are also replayed once to achive the slow motion effect.

Figure 6:
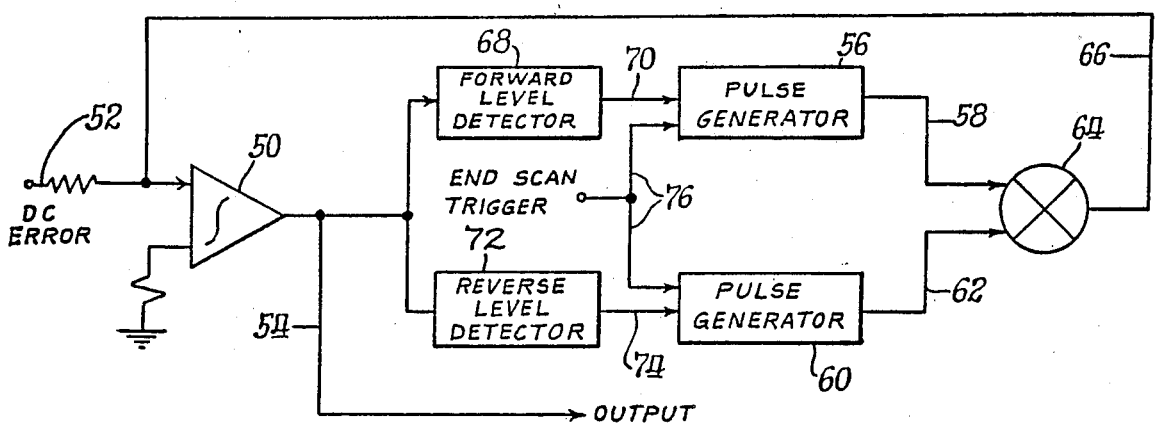
FIG. 6 is a schematic block diagram illustrating the electrical circuitry associated with the apparatus embodying the present invention.
Figure 7B:
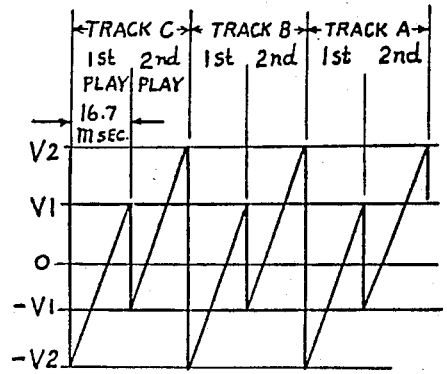
FIG. 7b is a voltage output wave form of the circuitry shown in FIG. 6 for producing the displacement pattern for the slow motion reverse direction operation shown in FIG. 5i; and, FIG. 8 represents electrical schematic diagrams of one form of circuitry that can be used to implement the block diagram of FIG. 6.

A specific schematic circuit diagram that can be used to carry out the operation of the circuit shown in the block diagram in FIG. 6 is shown in FIG. 8 to comprise the integrator 50 with input line 52 receiving the low frequency or D.C. error signal from a synchronous detector circuit associated with error detecting circuitry which does not form a part of the present invention. The error signal is applied through an analog switch 80 which may be a CMOS device that is close circuited when a positive voltage (operator mode control command) is present on line 82 and open circuited when it is not. Its function is to disable the special effects circuitry during normal play. The integrator 50 comprises an operational amplifier 81 having the industry standard numbers in parenthesis and pin numbers adjacent thereto with a feedback capacitor 84 with its output connected to line 54. The forward level detector 68 is coupled to the output line 54 through line 86 and resistor 88 and comprises an operational amplifier that is set to monitor the instantaneous voltage and provide a high output level on line 70 whenever the instantaneous voltage is about equal or greater than 0. Similarly, reverse level detector 72 also comprises an operational amplifier which also monitors the instantaneous output voltage through line 86 and a resistor 90 and it compares the output voltage with a voltage present on pin 1 which is adjustably controlled by a potentiometer 92 which is set at a higher level, such as about 3 volts for example. When the instantaneous output voltage approaches the preset limit, then the output voltage of the operational amplifier appearing on line 72 goes high.

The pulse generators 56 and 60 comprise monostable multivibrators or "one shots" which are actuated or fired when both inputs B are high inputs A receive a negative going transition. When each of the pulse generators is fired, a positive going pulse is produced on their respective Q outputs which is applied to the input of integrator 50 through line 66, adder 64 and respective lines 58 and 62. The $\bar{Q}$ output from each generator extends to other circuitry and is used for time base error correction. Line 76 is connected to input A of both pulse generators and is low when the advanced end of scan trigger pulse is present. Pulse generator 56 is connected to the forward limit detector 68 by line 70 connected to the B input. Since the generator 56 will fire on a negative going transition on line 76 when the input B is at a logic high level, whenever the level detector 68 detects a voltage below about 0, the pulse generator 56 will be inhibited. Similarly, line 74 which interconnects the output of reverse level detector 72 with the B input of pulse generator 60 is low whenever the voltage being monitored is less than the preset value of about 3 volts for example. Thus, pulse generator 60 will always be inhibited except when the voltage ramp approaches the higher level which represents the limit of transducing deflection in that direction. When this occurs both pulse generators fire producing the pulse of double magnitude for resetting the transducing head a total of 2 tracks. For example, from the output wave form of FIG. 7b for half speed reverse slow motion operation, the pulse generator 56 will be fired after every track is played and pulse generator 60 will be fired at the end of every second playback of a track.

Zener diodes 94 and 96 are provided to translate the voltage range of the outputs of the level detectors 68 and 70 to a range that is compatible with the pulse generators 56 and 60. Diodes 98 are provided to maintain a self centering feedback voltage to the input of the integrator to facilitate rapid lockup when a signal is resumed subsequently of a period where no signal was applied to the input. It should also be appreciated that the voltage of the output on line 54 extends to other summing circuits to which other signal components are added for application to the circuitry which drives the movable element 22. The output voltage is proportional to the deflection that is ultimately produced by the element.

In accordance with yet another aspect of the present invention, speeded up or fast motion effects can be achieved with the present invention. It should be understood that the circuitry specifically illustrated in FIGS. 6 and 8 will not accomplish fast motion operation because the ramp voltage from the integrator is inverted relative to that which is required. However, similar circuitry with appropriate level detectors and switching circuitry for connecting the same while the apparatus is operating in the fast forward mode (while similtaneously deactivating the circuitry of FIG. 6) while not shown, is within the scope of the present invention. Fast motion effects would be achieved by advancing the transducing head one or more directions while the tape is being transported at a speed that is faster than the transport speed during recording. Referring to FIGS. 5g and 5h, displacement patterns for fast motion where the tape is transported two and three times, respectively, are illustrated, with repositioning of the transducing head at the completion of every track. With respect to the two times fast motion, it is seem that every second track is skipped during playback with the transducing head being moved about 8.7 mils or one track to track spacing. It should be appreciated that the displacement of the transducing head will be in the opposite direction that occurred during slow motion or still frame modes of operation. With respect to the three times fast motion shown in FIG. 5h, it is necessary to have the transducing head skip two tracks so that every third track is replayed during operation at this speed, a repositioning distance of 17.4 mils is produced. It should also be appreciated that the three times fast motion shown in FIG. 5 has a total displacement of two center-to-center spacings, a displacement of about 17.4 mils, and that faster motion would require still additional deflection which must be compatible with the design and operation of the movable element 22 in terms of speed and total range of movement.

With respect to yet another aspect of the present invention, the apparatus is adapted to operate in a surveillance mode as well as a skip frame mode of operation. Referring to FIG. 5f which illustrates the displacement pattern for the transducing head when the apparatus is operating in a surveillance mode, the information is recorded at a significantly lower transport speed than during normal recording. Thus, the displacement pattern shown in FIG. 5f transport speed of 1/60 of the normal speed 133 with switching circuitry adapted to record every sixtieth frame. Thus, the video recorder scanner is triggered to record only one scan per second and disregard the next 59 scans which results in a synchronized recorded format with helix angles approximating a stop motion playback track. The recording of every sixtieth frame merely represents a specific example, it being understood that a greater or lesser number of frames than the 59 described could be skipped. In other words, the longitudinal tape transport speed during recording does not change the static or stop motion generated helix very much. During normal speed playback, an error in tracking occurs just as occurs in stop motion mode of operation for signals that were recorded at the normal transport speed. The tracking pattern shown in FIG. 5f will result in the transducing head accurately following the track during replay and repositioning the transducing head at the beginning of the next track by moving it downwardly as shown. The surveillance mode of operation permits a television field of information to be recorded each second which provides a good record in terms of a sequence of information fields that can approximate motion with an extraordinary savings in magnetic tape. Moreover, the quality of the reproduced signal is unimpaired by mistracking and crossover during playback.

With respect to the skip field mode of operation, and particularly a skip 1 field system having a displacement pattern of operation as shown in FIG. 5a, every other field is recorded and the other field is disregarded. The record and playback tape speeds are about ½ the normal transport speed when no fields are skipped. Since the record and playback speeds are identical (at the lesser speed) the angle of the tracks will be substantially identical during playback as during record so that no appreciable transverse movement of the transducing head is required during playing of a track and this is reflected by the horizontal lines during playing as shown in the drawing. However, during playback, the continual 60 Hertz information rate is required, which necessitates repeating each track twice. Thus, track A is replayed once by moving the transducing head at the completion of the first play of track A a distance of about 4.35 mils which places it in the correct position to repeat the playback of the track A. At the completion of the second play, it is necessary to advance the transducing head by moving it transversely downwardly for the first play of track B. It should be understood that the repositioning of the transducing head after each track is played requires a deflection of only ½ that required with respect to the 8.7 mils shown in the other displacement pattern for 1 center-to-center distance for the reason that the tape is moving only ½ of the speed during recording compared to the recording speed of the tracks that were described with respect to the other modes of operation. By utilizing the repositioning of the transducing head after playback of every track, the single head can achieve the same result as two heads have produced in similar skip field operation on prior art apparatus. It should also be appreciated that while the skip one field system displacement pattern is shown, the invention can be used to skip more than one field (each field occupying one track). Thus, every $n^{th}$ field may be recorded on a track, the intermediate fields disregarded, the tape driven at 1/n the normal transport speed during recording and playback and the transducing incrementally adjusted in a manner similar to that shown for the n equal 2 case described above. If every $n^{th}$ field is recorded, it is necessary to playback each field n times or, stated in other words, playback each track and repeat it $n-1$ times.

From the foregoing description, it should be understood that the embodiment represents a closed loop system in the sense that the error correcting signals that are used to maintain the transducing head on track during playback of a track receives continuously updated information from the error detecting circuitry. Because of the closed loop operation, the transducing head will accurately follow the track regardless of the transport speed or direction that is used. Since the circuitry is adapted to automatically make the decision when to have the transducing head advance to the next adjacent successive track during forward motion or the preceding-in-time track during reverse transport motion of the tape, conventional "infinitely adjustable" capstan drive circuitry can be used. Since the operator may wish to vary the slow motion speed for viewing an instant replay of a sporting contest event, for example, a potentiometer controller such as a "joy stick controller " may be used to control the capstan drive which transport the tape. Furthermore, the automatic decision-making feature of the error detecting circuitry permits the operator to advance the tape at arbitrary rates, including in a field-by-field step fashion with long intervals of stop motion, by manually turning the reels. This provides the operator with a valuable tool for tape editing purposes.

While the disclosed embodiment describes the closed loop system, it should be understood that an open loop apparatus is within the scope of the present invention and may be used. In such an open loop system, the integrator 50 would not receive the low frequency or D.C. error signal from the error detecting circuitry, but would typically employ an adjustable D.C. source that would be connected to the input of the integrator and adjusted to provide a voltage wave form that is related to the desired predetermined tracking or special motion effect. Such an open loop system would require that the tape speed be very carefully controlled so that the tape would run at the precise speed expected by the programming apparatus generationg the voltage wave form for producing the appropriate displacement patterns similar to those shown in FIG. 5. The careful precise controlling of the transport speed may impose a limitation on such a system from a practical standpoint.

From the foregoing description, it should be understood that a method and apparatus is described for achieving altered time base reference effects in the art of recording and reproducing information signals on a medium. In this regard, the invention is particularly well suited for creating special motion and other effects in the field of video recording without detracting from the quality of the signal being reproduced from the recording medium. Furthermore, the invention is especially suited for use in helical wrap video tape recorders for the reason that special motion effects, such as slow motion, still frame or stop motion and fast motion effects can be achieved without impairing the video signal that is derived from the magnetic tape. The system accurately follows the track during playback and automatically detects the position of the playback head near the completion of a track and decides whether to move the transducing head to a track other than the next adjacent successive track or not. Since the invention automatically makes the decision near the completion of playback of a track, the tape being transported in the slow motion mode can be moved at virtually any speed, thereby permitting the infinitely adjustable slow motion playback. The fast motion effect is limited only by the range of deflection of the transducing head, with the embodiment described and shown in the drawings permitting two or three times the "normal motion speed".

It is of course understood that although preferred embodiments of the present invention have been illustrated and described, various modifications, alternatives and equivalents thereof will become apparent to those skilled in the art and, accordingly, the scope of the present invention should be defined only by the appended claims and equivalents thereof.

Various features of the invention are set forth in the following claims.

What is claimed is:

1. In a magnetic tape playback apparatus of the type which has at least one transducing head operably supported by rotatable means for scanning a magnetic tape along a plurality of adjacent discrete parallel tracks oriented at an angle relative to the lengthwise direction of tape, the rotatable means including a movable means carrying said head and effecting movement of said head in opposite directions relative to a home position along a path generally transverse to the direction of said tracks, and including means for moving said head along said transverse path to accurately follow the track during playback, a method of providing playback of previously recorded information on said tracks at various tape transport velocities, said information having been recorded at a first tape transport velocity at a speed in a forward direction, comprising the steps of:

maintaining the speed of the rotation of said rotatable means substantially constant and in accordance with the head rotational speed maintained during recording;

adjusting the velocity of said tape being transported to a velocity other than said first velocity;

detecting a signal that is indicative of the transverse movement of the head being at least to a predetermined position at a predetermined time relative to the playback of each track; and controlling the movable means to position the head to begin following the track subsequently to be played back, said track subsequently to be played back being determined by the detected signal at said predetermined time.

2. A method as defined in claim 1 comprising adjusting the tape transport velocity to a velocity less than the tape speed during recording, and controlling the movable means to transversely move the transducing head a distance equal to one center-to-center distance between adjacent tracks so that the transducing head is positioned to begin playing back the same track again when the detected signal at said predetermined time is indicative of the transducing head being moved transversely to at least said predetermined position upon completion of playback of said track.

3. A method as defined in claim 2 further comprising adjusting the velocity of tape transporting to zero.

4. A method as defined in claim 2 comprising adjusting said tape transport velocity to a speed in the forward direction that is less than the tape speed during recording, and controlling the movable means so that the next adjacent later recorded track is played back when the detected signal at said predetermined time is indicative of the transducing head not being moved transversely to said predetermined position upon completion of playback of said track.

5. A method as defined in claim 1 comprising adjusting said tape transport velocity to a speed in the reverse direction no greater than the speed at which recording was performed, and controlling the movable means to transversely move the transducing means a distance equal to two center-to-center distances between adjacent tracks so that the transducing head is positioned to begin playback of the preceding-in-time adjacent track that was recorded before the track undergoing playback when the detected signal at said predetermined time is indicative of the transducing head being moved transversely to at least a second predetermined position upon completion of playback of said track.

6. A method as defined in claim 1 comprising adjusting the tape transport velocity to a speed in the forward direction that exceeds said speed at which recording was performed, and controlling the movable means to transversely move the transducing head a distance approximately equal to the center-to-center distance between adjacent tracks so that the next nonadjacent track that was recorded later than the track undergoing playback is played back when the detected signal at said predetermined time is indicative of the transducing means being moved transversely at least to said first predetermined position upon completion of playback of said track.

7. A method of playback in accordance with claim 1 wherein the track subsequently to be played back is additionally determined by the velocity of the tape.

8. A video information reproducing system comprising:

transducing means for reproducing video information recorded on a plurality of generally parallel tracks located adjacent one another on a recording medium;

means for mounting said transducing means so that said transducing means is capable of moving along a path substantially transversely of the tracks, said mounting means being carried by a rotatable element that is rotated to provide a preponderance of the relative movement between said transducing means and said medium to reproduce said video information from said medium;

means for selectively moving said mounting means so that said transducing means is moved along said path in either direction relative to a home position in response to a first control signal being applied to said moving means;

means for operating the system in one of several reproducing operating modes including forward slow motion reproducing, still frame reproducing, forward fast motion reproducing, and reverse motion reproducing, said operating means including record medium transport means for selectively moving said medium in the forward and reverse directions and for stopping the medium in correspondence with the operating mode in which the system is being operated;

means for producing said first control signal and a second control signal and applying the same to said moving means, said first control signal having a value related to the velocity of the medium to effect positioning of said transducing means to accurately follow a track during reproducing, said producing means detecting the value of a detected signal indicative of the transverse position of the transducing means at a predetermined time during the rotation of said rotatable element, said producing means producing said second control signal for application to the moving means to selectively effect the positioning of said transducing means to begin following a track subsequently to be reproduced, the track subsequently to be reproduced being determined by the value of the detected transverse position indicative signal and the velocity of said medium.

9. A system as defined in claim 8 wherein said rotatable element comprises a rotatable cylindrical drum carrying said mounting means and said transducing means and said recording medium is magnetic tape, said tape being helically wrapped around said cylindrical drum.

10. A system as defined in claim 8 wherein said track subsequently to be reproduced is the same track that was reproduced, in response to said system operating in said forward slow motion reproducing mode and the producing means detecting said transverse position indicative signal indicating that said transducing means is moved at least to a predetermined position along said transverse path at the completion of reproducing of said track, said producing means producing said second control signal for application to said moving means for effecting transverse movement of said transducing means along said transverse path a distance approximately equal to one center-to-center distance between adjacent tracks.

11. A system as defined in claim 8 wherein said track subsequently to be reproduced is the same track and is continuously reproduced, in response to said system operating in said still frame mode wherein the transport of said medium is stopped and said producing means detects said transverse position indicative signal indicating that said transducing means is moved at least to a predetermined position along said transverse path at the completion of reproducing of each track, said producing means producing said second control signal for application to said moving means to effect transverse movement of said transducing means along said transverse path a distance approximately equal to one center-to-center distance between adjacent tracks.

12. A system as defined in claim 8 wherein in response to said system operating in said reverse motion reproducing mode wherein said transport means transports said medium in the reverse direction said track subsequently to be reproduced is the same track completing reproducing in response to said producing means detecting a signal value indicating that said transducing means is moved at least to a first predetermined position along said transverse path at the completion of reproducing of said track whereupon said producing means produces said second control signal for application to said moving means to effect transverse movement of said transducing means along said transverse path a distance approximately equal to one center-to-center distance between adjacent tracks and the track subsequently to be reproduced is the preceding-in-time adjacent track that was recorded before the track completing reproducing in response to said producing means detecting said transverse position indicative signal indicating that said transducing means is moved at least to a second predetermined position along said transverse path downstream of said first predetermined position at the completion of reproducing of said track whereupon said producing means produces said second control signal for application to said moving means to effect transverse movement of said transducing means a distance approximately equal to two center-to-center distances between adjacent tracks.

13. A system as defined in claim 12 wherein said producing means includes means for inhibiting the generation of said second control signal when the value of the transverse position indicative signal at said predetermined time is indicative of said transducing means not being moved at least to said predetermined position along said transverse path at the completion of reproduction of said track.

14. A helical reproducing system for reproducing a video information signal from a magnetic tape which has been recorded at a first tape transport velocity on a plurality of discrete tracks located adjacent one another on and at an angle relative to the longitudinal direction of said tape, each of said tracks being of sufficient length to contain a predetermined quantity of information, said system having the capability of operating in at least one of the reproducing operating modes of forward slow motion reproducing, stopped motion reproducing, fast forward motion reproducing, reverse slow motion reproducing and reverse normal playback speed reproducing, said system comprising:

means for selecting a reproducing operating mode, said selecting means including means for adjusting the velocity of transport of said tape to a velocity other than said first velocity for said selected operating mode;

transducing means carried by a rotatable means for reproducing said video information signal as said transducing means is rotated to scan said tape along a track;

means for mounting said transducing means to said rotatable means for moving said transducing means along a path substantially transversely of the direction of said track, said mounting means being movable by an amount and along said transverse path to move said transducing means relative to a home position in response to and in accordance with a first and a second control signal being applied to the mounting means;

first means for generating said first control signal and applying the same to said movable mounting means to cause said transducing means to follow a track during reproducing thereof, said first control signal having a value varying in proportion to the transverse position of the transducing means along said path relative to a predetermined position;

second means for detecting the value of said first control signal at a predetermined time during the rotation of said rotatable means and generating said second control signal value for selectively effecting transverse movement of said transducing means along said path at the completion of reproducing of said track when the detected first control signal value corresponds to said transducing means being at least to said predetermined position at said predetermined time so that said transducing means is positioned to begin reproducing the track subsequently to be reproduced, said track subsequently to be reproduced being determined by the value of said first control signal at said predetermined time.

15. A system as defined in claim 14 wherein said predetermined quantity of information comprises the information content of one television field.

16. A system as defined in claim 14 wherein said first control signal is a voltage having a value which varies in proportion to the transverse position of said transducing means along said transverse path relative to said home position.

17. A system as defined in claim 16 wherein said mounting means comprises an elongated deflectable element supported at one end position and adapted to bend in one of two opposite directions along said transverse path upon application of said first control signal voltage thereto, the amount of bending movement being proportional to the value of the voltage applied, said transducing means being located on a nonsupported free end portion of the deflectable element.

18. A system as defined in claim 14 wherein the second means generates a second control signal value corresponding to a distance at least approximately equal to one center-to-center distance between adjacent tracks before beginning the reproduction of the next track by the transducing means when the detected value of the first control signal at said predetermined time is indicative of the transducing means being moved at least to said predetermined position along said transverse path at the completion of reproducing of a track.

19. A system as defined in claim 18 wherein the second means generates a first control signal value that changes over a range corresponding to a range of transverse movement of said transducing means of about two center-to-center distances between adjacent tracks.

20. A system as defined in claim 14 wherein:
said first control signal generating means comprises means for integrating a signal applied to the input thereof including an error signal that is indicative of an error of said transducing means in following a track during reproducing, the output of said integrating means providing said first control signal for positioning said transducing means; and
said second control signal generating means includes third means for generating a positioning signal for application to the input of said integrating means for causing said integrating means to generate said second control signal value for effecting transverse movement of said transducing means approximately equal to the center-to-center distance between adjacent tracks at the completion of reproducing of said track, said third means generating said positioning signal in response to receiving a trigger signal at said predetermined time, and fourth means operably connected to said integrating means for inhibiting said third means when the value of said first control signal is not above a first predetermined value corresponding to said predetermined position of said transducing means.

21. A system as defined in claim 20 wherein said first predetermined value is approximately zero.

22. A system as defined in claim 20 wherein said integrating means comprises a voltage integrator providing an output voltage control signal having a value that is indicative of the position of said transducing means relative to its home position.

23. A system as defined in claim 20 wherein:
said second control signal generating means includes fifth means for generating a second positioning signal for application to the input of said integrating means for causing said integrating means to generate said second control signal value for effecting transverse movement of said transducing means approximately equal to two center-to-center distances between adjacent tracks at the completion of reproducing of said track in response to said trigger signal, and sixth means operably connected to said integrating means for inhibiting said fifth means when the value of said first control signal is not above a second predetermined value corresponding to a second predetermined position of said transducing means; and
said second predetermined value is of a magnitude greater than said first predetermined value.

24. A helical scan signal transduction apparatus in which there is relative motion between at least one transducer and a tape transduction of signals along a discrete track as the transducer follows a corresponding path and in which each transducer is carried by a rotatable movable means for effecting movement of each transducer in opposite directions generally transverse to the direction of said path followed by said transducer, said apparatus including means for transporting said tape during transduction of signals at a velocity different from a velocity that normally produces a predetermined transducer to tape path angle relative to the longitudinal direction of said tape, comprising:
first means coupled to each movable means to effect transverse movement of the transducer carried by said movable means in one of said transverse directions to follow a path for a first inteval during the transduction of signals by said transducer;
second means coupled to each movable means for selectively effecting movement in the opposite transverse direction subsequent to said first interval and prior to a further interval during which said transducer carried by said movable means again transduces signals; and
third means for detecting a signal indicative of the position of said transducer being at least to a predetermined position in the direction of transverse movement relative to said path at a predetermined time relative to each transducing interval and for controlling said second means to effect movement in said opposite transverse direction in response to the detected signal.

25. In an information reproducing system having a transport means for transporting a medium at various velocities, apparatus for reproducing the information while the medium is being transported at any speed within a forward direction limit and a reverse direction limit, wherein the speed in the forward direction limit is less than the record transport speed and the speed in the reverse direction limit is the record transport speed comprising:
transducing means for reproducing information from a plurality of generally straight tracks located adjacent one another on and at angles to the lengthwise direction of the medium;
means for mounting said transducing means so that said transducing means is capable of moving along a path substantially transverse of the tracks, said mounting means being carried by a rotatable element that is rotated to provide a preponderance of the relative movement between said transducing means and said medium to reproduce said information;
means for selectively moving said mounting means so that said transducing means is moved along said transverse path in either direction relative to a home position in response to first and second control signals being applied to said mounting means;
means for detecting a signal that is indicative of the position of said transducing means at a predetermined time; and
means for producing said first and said second control signals and applying the same to said moving means, said signal producing means including first means being operable for producing said first control signal for transversely moving said transducing means generally in one direction to accurately follow a track during reproducing of information therefrom and second means being operable for producing said second control signal for transversely moving said transducing means in a direction opposite said one direction after reproducing information from said track, said second means producing said second control signal at a first predetermined magnitude for transversely moving said transducing means a distance equal to one track-to-track spacing in response to said position indicating signal indicating said transducing means being at least to a first predetermined position at said predetermined time and producing said second control signal at a second predetermined magnitude for transversely moving said transducing means a distance equal to two track-to-track spacings in response to said position indicating signal indicating said transducing means being at least to a second predetermined position beyond said first predetermined position.

26. A system for reproducing video information from a recording medium, the video information recorded on said recording medium along a plurality of generally straight tracks located adjacent one another on said recording medium while said recording medium is transported at a first velocity, comprising:
- transducing means for reproducing the video information, said transducing means being carried by a rotatable means that is rotated to provide a preponderance of the relative movement between said transducing means and the recording medium to reproduce video information from said recording medium;
- means for mounting the transducing means relative to the rotatable means so that said transducing means is capable of moving relative to said rotatable means in opposite directions along a path substantially transverse of the tracks;
- means for selectively moving the mounting means so that said transducing means is moved along said path in said opposite directions in response to a first and a second control signal being applied to said moving means; and
- means for generating said first and said second control signals and applying the same to the moving means, said control signal generating means being operable to generate said first control signal having a value that varies in accordance with the difference between the recording medium transport velocity during reproducing a track and said first velocity to move said moving means along said path to effect positioning of said transducing means to accurately follow said track during reproducing and being responsive to a signal that is indicative of the transducing means being at least to a predetermined transverse position along said path at a predetermined time during rotation of the rotatable means to generate said second control signal to selectively move said moving means to effect positioning of said transducing means at one of at least two selected positions along said path to begin following a track subsequently to be reproduced.

27. A helical scan magnetic tape reproducing system for reproducing a video information signal from a magnetic tape, said video information signal having been recorded on said magnetic tape along a plurality of discrete tracks located adjacent one another on and at an angle relative to the lengthwise direction of said magnetic tape while being transported along a helical path at a first velocity, said system including means capable of transporting said tape during reproduction of signals at a velocity different from said first velocity, the system including means responsive to the position of a signal reproducing means relative to a track of recorded signals being reproduced for generating an error signal indicative of a tracking position error of said signal reproducing means in following said track comprising:
- a magnetic head signal reproducing means carried by a rotatable means for reproducing the video information signal as said magnetic head reproducing means is rotated to scan the tape along a track;
- means for mounting the magnetic head signal reproducing means to the rotatable means, said mounting means movable along a path relative to a home position in response to a control signal being applied thereto for moving said magnetic head reproducing means substantially transversely of the direction of said tracks, said mounting means is responsive to said control signal to move a distance along said path relative to said home position corresponding to the value of the applied control signal;
- means for integrating input signals applied to an input thereto and providing the control signal at an output thereof with a value corresponding to the summation of the applied input signals, said input coupled to receive the error signal;
- first means for generating a positioning signal for application to the input of the integrating means for causing said integrating means to generate a control signal value for effecting transverse movement of the magnetic head signal reproducing means following completion of the reproduction of the video information signal from the track a distance at least approximately equal to the center-to-center distance between adjacent tracks in a direction opposite the direction of transverse movement of said magnetic head signal reproducing means during said reproduction of the video information signal from said track, said first means generating said positioning signal upon being enabled at a predetermined time determined by a timing signal that is indicative of the completion of the reproduction of the video information signal from the track by the rotated magnetic head signal reproducing means; and
- second means operably coupled to the integrating means and responsive to the value of the control signal provided thereby to be selectively conditioned to enable and disable the first means according to the value of said control signal relative to a first predetermined value, said second means conditioned to enable said first means when the value of said control signal is at least to said first predetermined value.

28. In a helical scan magnetic tape apparatus in which a magnetic tape is helically transported about an axis along a tape guide surface defined by a substantially cylindrical drum disposed coaxially with said axis while a video information signal is transferred with respect to said tape, said video information signal having been recorded along a track at an angle relative to the lengthwise direction of said tape as said tape is transported at a first velocity in the forward direction, the apparatus including a signal reproducing means rotated about the axis to follow a track during a revolution thereof and reproduce the video information signal from said track, means responsive to the position of said signal reproducing means relative to said track of recorded video information being reproduced for generating an error signal indicative of an error of said signal reproducing means in following said track, and means for generating a timing signal indicative of said signal reproducing means completing the reproduction of video information signal from said track, said apparatus including means capable of transporting said tape at velocities other than said first velocity, apparatus for reproducing the video information signal, comprising:
- a magnetic head signal reproducing means for reproducing the video information signal as said magnetic head signal reproducing means is rotated to scan the tape along a track;

a rotatable means coaxially disposed for rotation with respect to the axis;

an elongated positionable element extended between the rotatable means and the magnetic head signal reproducing means so that said magnetic head signal reproducing means is proximate the tape guide surface for reproducing the video information from the helically transported tape and for displacing said magnetic head signal reproducing means relative to said rotatable means along the axis to move along a path, said elongated positionable element being displaceable along said path relative to a home position in response to a control signal being applied thereto;

means for integrating a signal applied to an input thereto and providing the control signal at an output thereof, said input coupled to receive the error signal, said integrating means responsive to the error signal to generate a ramp control signal having a slope and a direction in accordance with the value of said error signal;

first means for generating a reset signal for application to the input of the integrating means for causing said integrating means to reset the ramp signal following the completion of reproduction of the video information signal from the track an amount corresponding to a distance at least approximately equal to the center-to-center distance between adjacent tracks, said first means generating said reset signal upon being enabled at a time determined by a timing signal; and second means responsive to the level of the ramp signal relative to a first predetermined value for selectively generating an enabling signal and a disabling signal at an output thereof, said second means generating said enabling signal when the level of said ramp signal is at least to said first predetermined value and generating said disabling signal when the level of said ramp signal is not at least to said predetermined value, said output of said second means coupled to the first means for enabling said first means upon generation of said enabling signal and disabling said first means upon generation of said disabling signal.

29. The apparatus as defined in claim 28 wherein the tape is transported at a reproduce velocity less than the first velocity while the magnetic head signal reproducing means reproduces the video information signal, the integrating means generates a ramp signal having a slope extending in a first direction to cause displacement of the magnetic head signal reproducing means in a direction corresponding to that which is opposite the direction of the transport of said tape during the recording of the video information signal, and the first means generates a reset signal to reset said ramp signal in a second direction opposite said first direction.

30. The apparatus as defined in claim 28 wherein said first means selectively generates reset signals to reset the ramp signal by a first amount corresponding to a distance at least approximately equal to one center-to-center spacing between adjacent tracks and by a second amount corresponding to a distance at least approximately equal to two center-to-center spacings between adjacent tracks, the second means generating a first enabling signal for enabling said first means to generate a reset signal for resetting said ramp signal said second amount when the level of said ramp is past a second predetermined value greater than the first predetermined value and generating a second enabling signal for enabling said first means to generate a reset signal for resetting said ramp signal when the level of said ramp signal is past the first predetermined value and less than said second predetermined value.

31. The apparatus as defined in claim 30 wherein the tape is transported at a reproduce velocity in the forward direction greater than the first velocity while the magnetic head signal reproducing means reproduces the video information signal, the integrating means generates a ramp signal having a slope extending in a first direction to cause displacement of the magnetic head signal reproducing means in a direction corresponding to that which is in the direction of the transport of said tape during the recording of the video information signal, and the first means generates the reset signals to reset said ramp signal in a second direction opposite said first direction.

32. The apparatus as defined in claim 28 wherein the first means generates a reset signal that causes said integrating means to reset the ramp signal before the video information signal is again reproduced.

33. A method for producing time base altered effects during playback of an information signal previously recorded on a magnetic tape transported at a first tape velocity along a plurality of discrete tracks located adjacent one another on and at an angle relative to the longitudinal direction of the tape, said method being adapted for use in a helical magnetic tape playback apparatus which has tape transport means capable of operating in an operating mode in which the tape velocity is other than said first tape velocity and which has at least one transducing means carried by a rotatable means for playing back the information signal as said transducing means is rotated to scan said tape along a track and which has movable means for mounting said transducing means to said rotatable means for moving said transducing means in a direction transversely of said track to enable said transducing means to follow one of the tracks during a scan of the tape and to move at least one track spacing prior to a subsequent scan of the tape by the transducing means, said method comprising:

maintaining the angular velocity of said rotatable means substantially constant at the angular velocity maintained during recording;

operating said tape transport means in said one operating mode;

causing said movable means to move said transducing means to follow a track during each scan of the tape during playback;

detecting a signal indicative of the transverse position of the transducing means at a predetermined time relative to the playback of the track;

determining from the detected indicative signal whether to cause the movable means to move the transducing means at least one track spacing prior to a subsequent scan of the tape by said transducing means; and controlling the movable means prior to the beginning of the subsequent scan in accordance with the determination.

34. A method as defined in claim 33 wherein the transport means is operated in an operating mode in which the tape velocity is slower than said first tape velocity and the movable means is controlled to move the transducing means one track spacing in the direction of tape transport so that the same track is followed during said subsequent scan when the detected signal is indicative of the transducing means not being moved upstream at least to a predetermined transverse position upon its completion of playback of the track.

35. A method as defined in claim 33 wherein the transport means is operated in an operating mode in which the tape velocity is faster than said first tape velocity and the movable means is controlled to move said transducing means one track spacing in the direction opposite tape transport upon completion of playback of a track when the detected signal is indicative of the transducing means not being moved downstream at least to a predetermined transverse position upon completion of playback of said track whereby said transducing means follows the next non-adjacent track during said subsequent scan that was recorded later than said track.

36. A method as defined in claim 35 wherein the transport means is in an operating mode in which the tape velocity is greater than two times faster than said first tape velocity and the movable means is controlled to move said transducing means one track spacing in the direction opposite tape transport upon completion of playback of a track when the detected signal is indicative of the transducing means being moved downstream to at least a first predetermined transverse position so that said transducing means follows said next-non-adjacent track and two track spacings in the direction opposite tape transport upon completion of playback of a track when the detected signal is indicative of the transducing means being moved further downstream to at least a second predetermined transverse position so that the transducing means follows the second non-adjacent track that was recorded later than said track during said subsequent scan.

37. A method as defined in claim 33 wherein the transport means is operated in an operating mode in which the tape is transported in a reverse direction and the movable means is controlled to move said transducing means one track spacing in the opposite direction of reverse tape transport so that the transducing means follows the same track during the subsequent scan when the detected signal is indicative of the transducing means not being moved downstream to at least a predetermined transverse position upon completion of the playback of said track and is controlled to move said transducing means two track spacings in the opposite direction of reverse tape transport so that the transducing means follows the next adjacent track during said subsequent scan that was recorded before said track when the detected signal is indicative of the transducing means being moved downstream to at least a predetermined transverse position upon completion of playback of said track.

38. A method as defined in claim 33 wherein said movable means is controlled to move said transducing means one track spacing when the detected indicative signal indicates that the transducing means is upstream of a transverse position midway between the outer extremes of the transverse movement of the transducing means.

39. A method as defined in claim 33 wherein the transport means is in an operating mode in which the tape transport is stopped and the movable means is controlled to move the transducing means one track spacing upon completion of playback of a track so that the transducing means follows said track again during each subsequent scan when the detected signal is indicative of the transducing means being moved upstream to at least a predetermined transverse position upon completion of playback of said track.

40. In a tape reproducing system in which a video signal is recorded at a first tape velocity on a plurality of discrete tracks located adjacent one another on and at an angle relative to the longitudinal direction of the tape, apparatus for reproducing the video signal to obtain special motion effects, comprising:
means for causing the tape to be transported at a selected reproducing velocity other than said first velocity;
at least one transducing means carried by a rotatable means for reproducing said video signal as said transducing means is rotated to scan said tape along a track;
means for mounting said transducing means to said rotatable means for moving said transducing means in a direction substantially transversely of the direction of said track;
control means for causing said transducing means to follow one of the tracks on a scan of the tape and to move at least a track spacing for a subsequent scan of the tape by the transducing means, said mounting means being movable in response respectively to a first control signal and a second control signal being applied to said control means between a downstream position and an upstream position relative to the direction of tape transport;
means responsive to the position of the transducing means with respect to the track being scanned for generating a signal indicating that the transducing means has completed reproducing the video signal on the track being scanned;
means for detecting the difference between the selected velocity at which the tape is transported during reproducing of the video signal and said first velocity and generating said first control signal having an amplitude which is proportional to the detected difference, whereby said mounting means is caused to move said transducing means to follow a track during reproducing thereof;
means for generating a positioning signal indicating that a movement of the transducing means of at least a track spacing for a subsequent scan of the tape will cause said transducing means to be moved beyond one of said downstream and upstream positions for the beginning of its subsequent scan; and
means for generating said second control signal in response to said reproducing completion signal and in response to said positioning signal and applying said second control signal to the control means to cause the transducing means to move at least a track spacing prior to its subsequent scan of the tape, whereby the special motion effects are determined by the selected reproducing velocity of the tape.

41. Apparatus according to claim 40 wherein said means for generating said first control signal provides a ramp signal having a slope varying in proportion to the velocity difference and a tracking error correction signal corresponding to error in the position of the transducing means relative to the track being followed to cause said transducing means to follow said track in moving from the beginning end to the concluding end of said track.

42. Apparatus according to claim 41 wherein said means for generating said first and said second control signals is an integrator having an input for receiving a signal indicative of the velocity at which the tape is transported.

43. Apparatus according to claim 42 wherein the signal indicative of the velocity at which the tape is transported is an error signal representative of error in the position of the transducing means relative to the track being scanned, and the means for generating said second control signal is responsive to said first control signal provided by the integrator to apply said second control signal to said integrator when said first control signal is at a value that causes the position of the transducing means resulting from transverse movement of the transducing means to be upstream of a preselected position.

44. Apparatus for transferring information signals with respect to discrete tracks on and at an angle relative to the longitudinal direction of a tape while the tape is caused to be transported at a velocity different from a first velocity that produces a path of travel of at least one transducer that is at a predetermined angle relative to the longitudinal direction of the tape, the transducer being carried by a rotatable means for scanning said transducer relative to the tape, and the transducer being mounted to the rotatable means by means for moving said transducer in a direction substantially transverse of the path of travel in response to applied control signals, comprising:
 means for detecting the velocity at which the tape is transported;
 means responsive to the detected velocity for generating a first control signal and applying the same to said moving means, said first control signal varying in accordance with the difference between the detected velocity and the first velocity to cause said moving means to move the transducer in the transverse direction to follow a track during an interval of transfer of information signals with respect thereto; and
 means for generating a second control signal according to the difference between the detected velocity and the first velocity and applying the same to said moving means to cause the transducer to be positioned following said interval to begin following a track with respect to which information signals are to be transferred subsequent to said interval.

45. Apparatus for transferring information signals with respect to discrete tracks on and at an angle relative to the longitudinal direction of a tape while the tape is caused to be transported at a velocity different from a first velocity that produces a path of travel of at least one transducer that is at a predetermined angle relative to the longitudinal direction of the tape, the transducer being carried by a rotatable means for scanning said transducer relative to the tape, and the transducer being mounted to the rotatable means by means for moving said transducer in a direction substantially transverse of the path of travel in response to applied control signals, comprising:
 means for detecting the position of the transducer relative to the path of travel;
 means for generating a first control signal and applying the same to said moving means, said first control signal varying in accordance with the difference between the velocity at which the tape is caused to be transported and the first velocity to cause said moving means to move the transducer in the transverse direction to follow a track during an interval of transfer of information signals with respect thereto; and
 means responsive to the detected position of the transducer for generating a second control signal according to said detected position and applying the same to said moving means to cause the transducer to be positioned following said interval to begin following a track with respect to which information signals are to be transferred subsequent to said interval.

46. Apparatus as defined in claim 45 further comprising:
 means for detecting the velocity at which the tape is transported; and wherein
 the means for generating a first control signal is responsive to the detected velocity to generate said first control signal varying in accordance with the difference between the detected velocity and the first velocity.

47. Apparatus as in any one of claims 44, 45 or 46 in which the first control signal causes the moving means to move the transducer in a first direction transverse to the path of travel of the transducer, and the second control signal causes the moving means to move the transducer selectively in a second direction transverse to the path of travel of the transducer and opposite said first direction.

48. Apparatus as in any one of claims 44, 45 or 46 in which said first control signal is a ramp signal having a slope dependent upon the difference between the velocity at which the tape is caused to be transported and said first velocity.

49. Apparatus as in claim 48 in which
 means are provided which is responsive to the transverse position of said transducer relative to the path of travel for generating an error signal indicative of a tracking position error of said transducer in following said path of travel; and
 said error signal being applied to the input of the ramp generator to thereby vary the slope of the ramp signal in accordance with the error signal.

50. Apparatus as in claim 49 in which
 said second control signal generating means includes means for detecting the level of the ramp signal at a predetermined time during the rotation of the rotatable means, and means responsive to the level detecting means for generating the second control signal following said interval to move the transducer in the second direction when the detected level of the ramp signal corresponds to the transducer being at least to a predetermined position.

51. Apparatus as in claim 48 in which
 said second control signal generating means includes means for detecting the level of the ramp signal at a predetermined time during the rotation of the rotatable means, and means responsive to the level detecting means for generating the second control signal following said interval to move the transducer in the second direction when the detected level of the ramp signal corresponds to the transducer being at least to a predetermined position.

52. Apparatus for transferring information signals with respect to discrete tracks on and at an angle relative to the longitudinal direction of a tape while the tape is caused to be transported at a velocity different from a first velocity that produces a path of travel of at least one transducing means that is at a predetermined angle relative to the longitudinal direction of the tape, comprising:
- at least one transducing means carried by a rotatable means so as to rotate said transducing means to scan said tape;
- means mounting said transducing means to said rotatable means for moving said transducing means substantially transverse of the direction of the path of travel in response to an applied control signal to enable said transducing means to follow tracks on the tape; and
- means for generating said control signal as a composite signal having first and second components and applying the same to said moving means, said first component being a ramp signal having a slope in accordance with the difference between the velocity at which the tape is caused to be transported and said first velocity to cause said moving means to move the transducing means in the transverse direction to follow a track during an interval of transfer of information signals with respect to the tape, said second component varying subsequent to said interval according to the difference between the velocity at which the tape is caused to be transported and said first velocity to cause said moving means to position the transducing means to begin following a track with respect to which information signals are to be transferred subsequent to said interval, said first component having an amplitude that is different from the amplitude of the second component whereby said transducing means follows a track as the tape is transported at said velocity different from said first velocity.

53. Apparatus according to claim 52 wherein the first component causes the moving means to move the transducing means in a first direction transverse to the path of travel of the transducing means, and the second component causes the moving means to move the transducing means in a second direction transverse to the path of travel of the transducing means opposite said first direction.

54. Apparatus according to claim 52 wherein the second component is generated upon completion of each interval of transfer of information signals with respect to the tape.

55. Apparatus as in any one of claims 52, 53 or 54 in which
- means are provided which is responsive to the transverse position of said transducing means relative to the path of travel for generating an error signal indicative of a tracking position error of said transducing means in following said path of travel; and
- said control signal generating means includes a ramp generator for generating the first component, said error signal being applied to the input of the ramp generator to thereby vary the slope of the ramp signal in accordance with the error signal.

56. Apparatus as in claim 52, 53 or 54 in which
said second component is generated by means for detecting the level of the ramp signal at a predetermined time during the rotation of the rotatable means, and means responsive to the level detecting means for generating the second component subsequent to said interval to position the transducing means to begin following a track with respect to which information signals are to be transferred subsequent to said interval.

57. Apparatus as in claim 55 in which
said second component is generated by means for detecting the level of the ramp signal at a predetermined time during the rotation of the rotatable means, and means responsive to the level detecting means for generating the second component subsequent to said interval to position the transducing means to begin following a track with respect to which information signals are to be transferred subsequent to said interval.

* * * * *